US011052720B2

(12) United States Patent
Bärecke et al.

(10) Patent No.: US 11,052,720 B2
(45) Date of Patent: Jul. 6, 2021

(54) METHOD FOR ACTUATING THE VIBRATION DAMPER OF A WHEEL SUSPENSION

(71) Applicant: VOLKSWAGEN AKTIENGESELLSCHAFT, Wolfsburg (DE)

(72) Inventors: Frank Bärecke, Wolfsburg (DE); Khatab Shaddy, Meinersen (DE); Stefan Kukla, Wathlingen (DE)

(73) Assignee: Volkswagen Aktiengesellschaft ( * ) Notice: Subject to any disclaimer, the term of this patent is extended or adjusted under 35 U.S.C. 154(b) by 0 days.

(21) Appl. No.: 16/321,078

(22) PCT Filed: Jul. 10, 2017

(86) PCT No.: PCT/EP2017/067254
§ 371 (c)(1),
(2) Date: Jan. 28, 2019

(87) PCT Pub. No.: WO2018/036709
PCT Pub. Date: Mar. 1, 2018

(65) Prior Publication Data
US 2019/0168563 A1 Jun. 6, 2019

(30) Foreign Application Priority Data

Aug. 25, 2016 (DE) ...................... 10 2016 216 008.7

(51) Int. Cl.
B60G 17/08 (2006.01)
B60G 17/0165 (2006.01)

(52) U.S. Cl.
CPC ......... B60G 17/08 (2013.01); B60G 17/0165 (2013.01); B60G 2400/102 (2013.01);
(Continued)

(58) Field of Classification Search
CPC ............... B60G 17/08; B60G 17/0165; B60G 2400/102; B60G 2400/204; B60G 2400/821; B60G 2401/142; B60G 2500/10
See application file for complete search history.

(56) References Cited

U.S. PATENT DOCUMENTS 5,235,529 A * 8/1993 Hanson ................ B60G 17/018
280/5.515
5,324,068 A * 6/1994 Kallenbach .......... B60G 17/018
280/5.512
(Continued)

FOREIGN PATENT DOCUMENTS

DE 10344053 A1 4/2004
DE 102005044486 A1 3/2007
(Continued)

OTHER PUBLICATIONS

Search Report for German Patent Application No. 10 2016 216 008.7; dated Apr. 21, 2017.
(Continued)

Primary Examiner — Frank B Vanaman
(74) Attorney, Agent, or Firm — Barnes & Thornburg LLP

(57) ABSTRACT

A method for actuating the vibration damper of a transportation vehicle wheel suspension including generating data which represents the topography of the roadway lying in front of the transportation vehicle; analyzing the data with respect to roadway unevenness; adjusting the vibration damper while taking into consideration the evaluation of the roadway unevenness, wherein the amplitude spectrum of the roadway unevenness is ascertained from the data; and generating a specification for the damping of the vibration damper based on the amplitude spectrum.

17 Claims, 4 Drawing Sheets

(52) U.S. Cl.
CPC .. *B60G 2400/204* (2013.01); *B60G 2400/821* (2013.01); *B60G 2401/142* (2013.01); *B60G 2500/10* (2013.01)

(56) References Cited

U.S. PATENT DOCUMENTS

| | | | | |
|---|---|---|---|---|
| 5,721,681 | A * | 2/1998 | Borschert | B60G 17/018 280/5.507 |
| 2002/0045977 | A1 | 4/2002 | Uchiyama et al. | |
| 2003/0137673 | A1 | 7/2003 | Cox et al. | |
| 2004/0153227 | A1 * | 8/2004 | Hagiwara | G06N 3/0436 701/40 |
| 2009/0043451 | A1 * | 2/2009 | Harder | B60G 17/08 701/37 |
| 2009/0248247 | A1 * | 10/2009 | Furuichi | B60G 17/016 701/37 |
| 2010/0207343 | A1 | 8/2010 | Sano | |
| 2014/0222287 | A1 | 8/2014 | Popham et al. | |
| 2014/0303844 | A1 | 10/2014 | Hoffmann et al. | |
| 2016/0159187 | A1 * | 6/2016 | Mohamed | B60G 17/08 701/37 |

FOREIGN PATENT DOCUMENTS

| | | |
|---|---|---|
| DE | 102008053007 A1 | 10/2009 |
| DE | 102010018902 A1 | 11/2011 |
| DE | 102012218937 A1 | 4/2013 |
| DE | 102012022367 A1 | 5/2014 |
| DE | 102014204519 A1 | 10/2014 |
| DE | 102015202405 A1 | 8/2016 |
| WO | 2009075151 A1 | 6/2009 |
| WO | 2016015846 A1 | 2/2016 |

OTHER PUBLICATIONS

Search Report for International Patent Application No. PCT/EP2017/067254; dated Sep. 25, 2017.

* cited by examiner

METHOD FOR ACTUATING THE VIBRATION DAMPER OF A WHEEL SUSPENSION

PRIORITY CLAIM

This patent application is a U.S. National Phase of International Patent Application No. PCT/EP2017/067254, filed 10 Jul. 2017, which claims priority to German Patent Application No. 10 2016 216 008.7, filed 25 Aug. 2016, the disclosures of which are incorporated herein by reference in their entireties.

SUMMARY

Illustrative embodiments relate to a method for actuating the vibration damper of a transportation vehicle wheel suspension, comprising the generation of data that represent the topography of the road ahead of the transportation vehicle, the analysis of the data regarding road unevenness and adjusting the vibration damper while taking into account the analysis of the road unevenness.

BRIEF DESCRIPTION OF THE DRAWINGS

The disclosed embodiments are described in detail below in connection with the drawings. In the figures.

DETAILED DESCRIPTION

Figure 1:
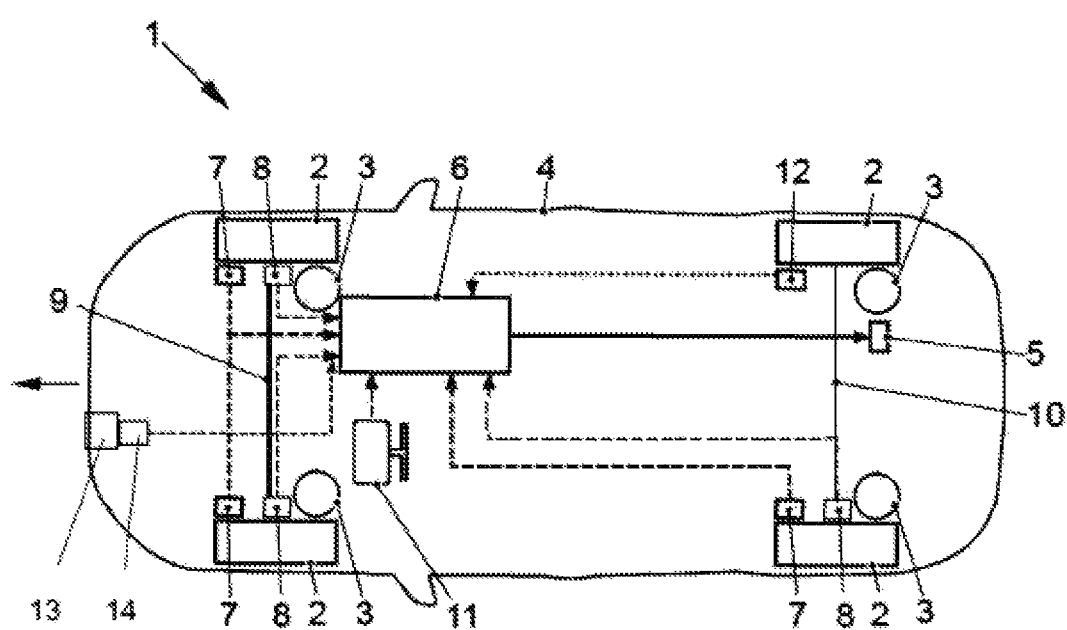
FIG. 1 shows a schematic representation of a transportation vehicle with a system for actuating the vibration damper of a wheel suspension of the transportation vehicle.

In contrast to passive vibration dampers, actuatable vibration dampers enable variation of the damping rate in the driving mode. In the case of semi-active vibration dampers, the damper force can be influenced by actuating a relief valve. The auxiliary energy used for this is only used here for actuating the valve for the purpose of varying the phase position of the energy take-up and energy output by the damper. In the case of active vibration dampers by contrast, the auxiliary energy is used to output a desired force with damping in each direction or to produce a desired force with energy input. Compared to a semi-active vibration damper, considerably more energy must therefore be provided for actuation, for which reason semi-active vibration dampers are mainly used as actuatable vibration dampers in transportation vehicle wheel suspensions.

An actuatable vibration damper is described in DE 10 2008 053 007 A1, for example. By using an actuation based on predictive sensor signals, inter alia an "electronic" end stop is implemented on the vibration damper. In this case, the fact that certain information is known in advance is exploited. In the case of transportation vehicles, after a certain time stimulation of the front axle also reaches the rear axle. Thus, for example, using the wheel movement of the front axle, conclusions can be drawn regarding obstacles or road stimuli that also stimulate the wheels of the rear axle depending on the driving speed and the wheelbase. This can be used to suitably adjust the damping of the vibration dampers of the rear axle. This is not readily possible for the vibration dampers of the front axle, by contrast.

Furthermore, from DE 10 2012 218 937 A1 a system is known, in which the road ahead of the transportation vehicle is taken into account for actuation of the vibration damper. For this purpose, a plurality of cameras is provided on the transportation vehicle, which are directed at a region of the road at about 1 to 10 m ahead of the transportation vehicle. The recorded image data are analyzed with regard to road unevenness. For this purpose, it is proposed inter alia to mathematically assess the heights of different sections of the road surface ahead and to provide a defined mathematical description of the heights. The description is then taken into account during the adjustment of the damping of the vibration damper.

A further method that takes into account the topography ahead of the transportation vehicle for the adjustment of the damping of the vibration damper and that operates with infrared signals is known from US 2014/0222287 A1.

A fundamental problem with the implementation of preview functions based on image data is that the accuracy of the road imaging is sometimes inadequate. The inaccuracy is directly reflected in the ride comfort.

Disclosed embodiments provide a remedy for this problem. The disclosed embodiments provide a preview function for the actuation of the vibration damper of a transportation vehicle wheel suspension that is more efficient and more harmonious with regard to the ride comfort.

This is achieved by the disclosed method. The disclosed method for actuating the vibration damper of a transportation vehicle wheel suspension includes the generation of data that represent the topography of the road ahead of the transportation vehicle, the analysis of the data with regard to road unevenness, and the adjustment of the vibration damper while taking into account the analysis of the road unevenness, wherein the amplitude spectrum of the road unevenness is determined from the images and a specification for the damping of the vibration damper is generated depending on the amplitude spectrum.

Owing to such an advance detection of the vibration stimulation of the transportation vehicle by the road, a damper controller can more accurately adjust comfortable and road-safe damping of the vibration damper for the section of the road to be traversed.

Because road unevenness is taken into account stochastically, an improvement in the comfort behavior is achieved compared to methods that take the exact positions of individual road stimuli into account because inaccuracies in the road imaging have less effect.

Thus, for example, a weighted amplitude can be determined from the amplitude spectrum and the specification for the damping of the vibration damper can be produced as a function of the determined weighted amplitude. This enables particularly relevant frequency ranges for the damping behavior to be particularly taken into account.

This enables the conflict of objectives between a desired high damping in a limited range about the natural frequency of the body and a very low damping for frequencies outside the range to be mitigated. If the amplitudes in the range outside the natural frequency of the body are large, then the specification for the damping is revoked. The same applies to the range of natural wheel frequencies.

In a first operation, only frequencies above the natural frequency of the body of the transportation vehicle are considered during the weighting. The frequencies can all be weighted equally or may also be weighted differently.

Furthermore, the amplitudes within a limited range about the natural frequency of the body and the amplitudes outside the range of the natural frequency of the body can be compared for the specification of the damping, whereupon larger amplitudes in the region of the natural frequency of the body tend to increase the damping, and by contrast smaller amplitudes in the region of the natural frequency of the body tend to reduce the damping.

This enables natural movements of the transportation vehicle body to decay very quickly on the one hand. On the other hand, it is prevented that road shocks are absorbed as gently as possible and not passed into the transportation vehicle body.

Accordingly, it is possible with regard to stimulations in the region of the natural wheel frequencies to compare the amplitudes in a limited range about the natural frequency of the wheel and the amplitudes outside the region of the natural frequency of the wheel for the specification of the damping, and the damping tends to be increased at larger amplitudes in the region of the natural frequency of the wheel, and by contrast the damping tends to be reduced at smaller amplitudes in the region of the natural frequency of the wheel.

Furthermore, weighting of the damping for the region of the natural frequency of the body and the region of the natural frequency of the wheel is possible, wherein body frequency and wheel frequency stimulations can in principle also be negatively weighted. A heavier weighting of the body frequency stimulations results primarily in more comfortable behavior, whereas a heavier weighting of the wheel frequency components tends to result in more driving-safety behavior.

The consideration that is described above of the road unevenness ahead of the transportation vehicle may be used for pre-control of the damping of the vibration damper in combination with otherwise conventional damper control.

The vertical movement of the transportation vehicle body can be detected on a transportation vehicle for actuating the vibration damper and a specification for the damping of the vibration damper can be produced while taking into account the vertical movement. The specification from the vertical movement and the specification from the analysis of the road unevenness can be weighted relative to each other depending on the driving situation. The damping of the vibration damper is then adjusted as a function of the weighting.

In this case, in a driving situation with great road unevenness and small vertical movement of the transportation vehicle body the specification from the analysis of the road unevenness can be weighted more strongly. In other cases, the damping can be adjusted based on the specification from the vertical movement. In addition, setting states are possible that are based on a combination of both specifications.

FIG. 1 shows a transportation vehicle 1, the wheel suspension of which comprises an actuatable vibration damper 3 per transportation vehicle wheel 2, by which the respective transportation vehicle wheel 2 is supported against a transportation vehicle body 4. The actuatable vibration dampers 3 can be embodied as semi-active or active vibration dampers. In FIG. 1, a control valve 5 associated with a semi-active vibration damper is indicated by way of example. Control of the vibration damper 3 with regard to the damping rate is carried out by a control unit 6, which can be embodied as described in DE 10 2008 053 007 A1, for example.

Three acceleration sensors 7 are disposed on the transportation vehicle body 2 by way of example. The sensors can be embodied as vertical acceleration sensors without limitation thereto. From the position thereof on the transportation vehicle body 2 and based on knowledge of the geometry of the transportation vehicle, the vertical acceleration can be calculated for each point on the transportation vehicle from the signals of the acceleration sensors 7, and as a result information about the yaw and roll behavior of the transportation vehicle can be obtained. It is however also possible to produce the acceleration of the transportation vehicle body in the region of a selected vibration damper 3 by using other sensors installed on the transportation vehicle.

FIG. 1 further shows three level sensors 8, each of which is associated with one of the vibration dampers 2 for detecting the level position. In the present case, two level sensors are associated with the vibration dampers 2 of the front axle 9 of the transportation vehicle 1 and one level sensor 8 is associated with one of the vibration dampers 2 of the rear axle 10 of the transportation vehicle 1. The level sensor 8 of the rear axle 10 is disposed in the vicinity of the left rear wheel but can also be mounted on the other side of the axle near the transportation vehicle wheel or can even be disposed in the center of the axle, for example. A different arrangement of the three level sensors 8 is also possible. In one variation, a level sensor can also be provided per transportation vehicle wheel 2, as described in DE 10 2008 053 007 A1.

Furthermore, a steering angle sensor 11 is provided on the transportation vehicle 1, with which the steering angle applied to the steering wheel by the driver is detected.

Moreover, wheel revolution rate sensors 12 for the individual wheels of the transportation vehicle are provided on the transportation vehicle, of which only the wheel revolution rate sensor 12 for the right rear wheel is represented in FIG. 1.

Furthermore, at least one camera 13 is disposed on the transportation vehicle 1, which is directed towards the road ahead of the transportation vehicle 1. The camera may detect a region of the road about 1 to 20 m ahead of the transportation vehicle 1.

The signals of the sensors are processed in the control unit 6, which is used to adjust the damping of the individual vibration dampers 3, i.e., to specify the damping rate of the individual vibration dampers as required. In this case, the concept described in DE 10 2008 053 007 A1 can be used. The related disclosure content of DE 10 2008 053 007 A1 is explicitly included here.

Figure 2:
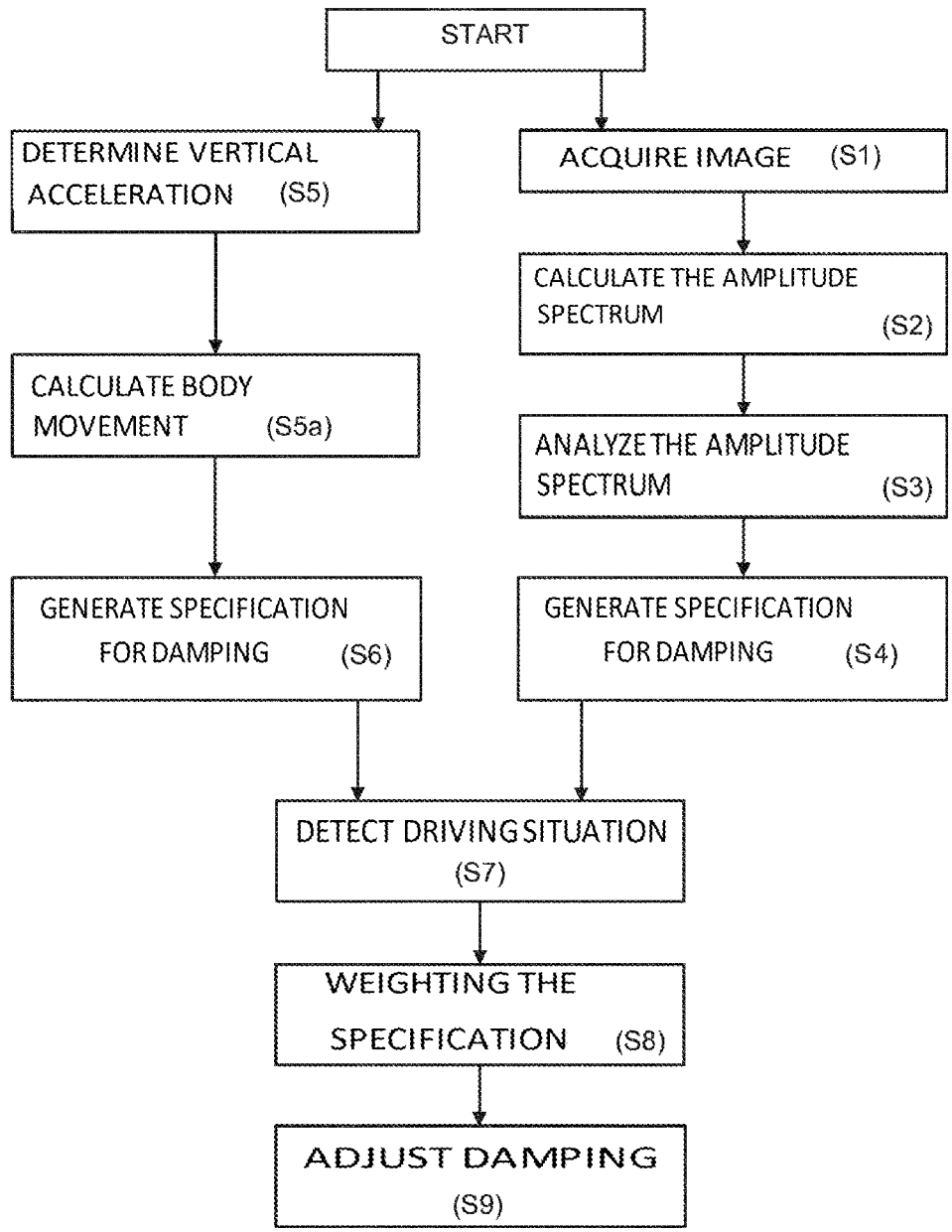
FIG. 2 shows a first exemplary embodiment of a method for actuating the vibration damper.

The camera 13 produces data that represent the topography of the road ahead of the transportation vehicle (cf. operation at S1 in FIG. 2). In the present case, images continuously acquired by the camera 13 are analyzed with image data processing methods for this purpose.

The latter can either be carried out in the control unit 6 or in a separate camera control unit 14 that is connected thereto.

Other measurement principles can also be used for detecting the road surface. In the present case, any device that is suitable for generating images of the road ahead of the transportation vehicle is therefore also understood as the camera 13.

With the system described above, the method described in detail below using FIG. 2 for actuating the vibration damper 3 can be implemented.

This is based on the basic idea that increased damping in the region of a resonant frequency is beneficial but has a negative effect away from a resonant frequency. With stimulations, a resonant peak occurs in the region of the natural frequency of the body and the natural frequency of the wheel. In this case, greater damping results in smaller vibration amplitudes. If the transportation vehicle is stimulated in the frequency range, greater damping is recommended to prevent escalation of the vibrations. In the region between the natural frequency of the body and the natural frequency of the wheel, boosted damping by contrast results in larger stimulation amplitudes of the transportation vehicle body, which is undesirable as a rule.

The data recorded by the camera 13 are continuously analyzed with regard to road unevenness (cf. operation at S2 in FIG. 2). In doing so, the stimulation amplitudes that result from protrusions and depressions are detected, as are the intervals between them to also determine the associated wavelengths of the road stimuli in addition to the stimulation amplitudes. Using the driving speed, the respective stimulation frequency can be determined from the wavelengths, so that an amplitude spectrum can be determined for the recorded data as a function of the frequency, as represented by way of example in FIG. 3.

Figure 3:
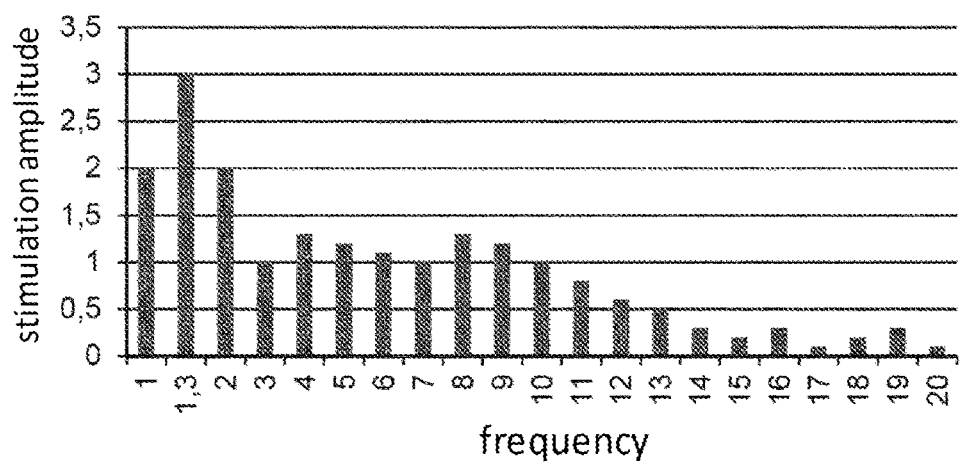
FIG. 3 shows an example of an amplitude spectrum.

The amplitude spectrum represented in FIG. 3 shows the average amplitudes for defined frequency ranges by way of example, so that a discontinuous spectrum results. It is however equally possible to represent the stimulation amplitude against the frequency as a continuous spectrum.

With the amplitude spectrum, there is information about the forthcoming stimulation of the transportation vehicle 1 by the road ahead thereof. The natural frequency of the body of a transportation vehicle and the natural frequency of the wheels of a transportation vehicle are usually known for a transportation vehicle. The natural frequency of the body of a transportation vehicle usually lies in the range of about 0.8 to 2 Hz. The natural frequency of the wheels usually lies in the range of about 10 to 15 Hz. Using the amplitude spectrum, it can thus in principle be determined whether the stimulations occur intensified in the region of the mentioned natural frequencies or in regions away from the natural frequencies. As already mentioned, it is beneficial with regard to the ride comfort and for driving safety to attenuate stimulations in the region of the natural frequencies as much as possible, but away from the regions to adjust the damping on the vibration dampers 3 to be as soft as possible so as not to pass corresponding shocks from the road stimuli into the transportation vehicle body. There is thus a conflict of objectives with different stimulation frequencies and amplitudes. The knowledge of the amplitude spectrum enables the damping of the vibration damper 3 to be adjusted better with regard to the forthcoming stimulation by the road, wherein a suitable weighting can be carried out between ride comfort and driving safety as required. In this case, qualitatively better results are achieved regardless of the weighting than with analyses for the specification of the damping that take into account individual events in the roadway or only average amplitudes.

Finally, a specification for the damping of the vibration damper 3 is produced as a function of the amplitude spectrum (cf. operation at S4 in FIG. 2). For this purpose, suitable algorithms are stored in the control unit 6 without the disclosure being limited to a certain procedure here. Some possibilities are indicated further below only by way of example.

The method described above may be used as a pilot control for a conventional damper control. The latter is based, for example, on detecting the vertical movement of the transportation vehicle body (cf. operation at S5 in FIG. 2) and producing a specification for the damping of the vibration damper 3 (cf. operation at S6 in FIG. 2) while taking into account the vertical movement, which, for example, can be calculated from the detected vertical acceleration (cf. operation at S5a). Thus, the damping can be specified in proportion to the vertical body speed or damper speed, for example.

While taking into account the respective driving situation, which is detected in operation at S7, it is then decided which specification to follow and possibly to what extent to follow it, i.e., the specification from the vertical movement and the specification from the analysis of the road unevenness are weighted relative to each other depending on the driving situation (cf. operation at S8). In the extreme case, this can also mean that one of the specifications excludes the other. The damping of the vibration damper 3 is finally adjusted as a function of such a weighting. For this purpose, corresponding actuating signals are generated in the control unit 6, for example, and are transmitted to the control valves 5 of the vibration dampers 3 (cf. operation at S9 in FIG. 2).

A driving situation-dependent weighting can, for example, consist of giving greater weight to the specification from the analysis of the road unevenness in a driving situation with great road unevenness and small vertical movement of the transportation vehicle body. Suitable threshold values can be maintained for this purpose, for example.

Otherwise, the specification from the conventional damper control is given greater weight.

Figure 4:
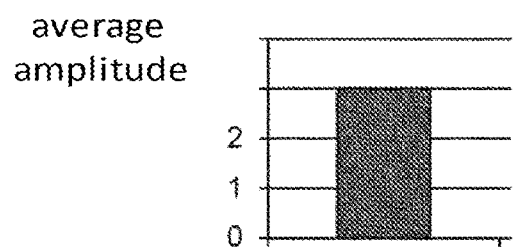
FIG. 4 shows a first disclosed embodiment version for analysis of the amplitude spectrum.

FIG. 4 now shows a first possibility for analysis of the amplitude spectrum. This consists of determining the average stimulation amplitude above the natural frequency of the body and determining the specification for the damping as a function thereof. In this case, a limit can be applied to a frequency range above the natural frequency of the body to a maximum of about 20 Hz.

A very simple possibility for the specification of the damping consists of reducing the damping with increasing road stimuli by using a specified characteristic curve, for example.

If it is desired to attenuate an existing body movement, the damping can be reduced as a function of the unevenness of the road that is being traversed to minimize the input of shocks. This can, for example, be carried out with a characteristic field, which contains a raw value for the damping and the road stimuli as input variables and which outputs the new damping value as an output. If no road unevenness is detected ahead of the transportation vehicle, then the damping value is not reduced. In the case of detected road unevenness, the damping is reduced with increasing road unevenness.

Figure 5:
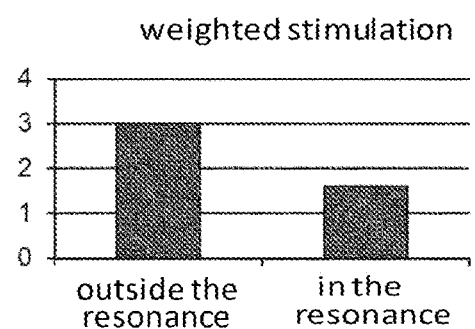
FIG. 5 shows a second disclosed embodiment version for analysis of the amplitude spectrum.

FIG. 5 shows a further approach, with which a distinction is made between the stimulation amplitudes in a narrowly limited range about the natural frequency of the body and/or the natural frequency of the wheel on the one hand (resonant region) and a region away from the frequencies (outside the resonance). For the specification of the damping, the amplitudes in the limited regions about the natural frequency of the body/natural frequency of the wheel and the amplitudes away from the region of the natural frequency of the body are compared. A comparison amplitude can be determined for each region for this purpose, for example. At larger amplitudes in the region of the natural frequency of the body/natural frequency of the wheel the damping tends to be increased, whereas by contrast at smaller amplitudes in the region of the natural frequency of the body the damping tends to be reduced. Better damping can be achieved by corresponding weighting of the frequency ranges according to the influence of damping. Selective damping can also be limited only to the region of the natural frequency of the body or the natural frequency of the wheel as required.

Figure 6:
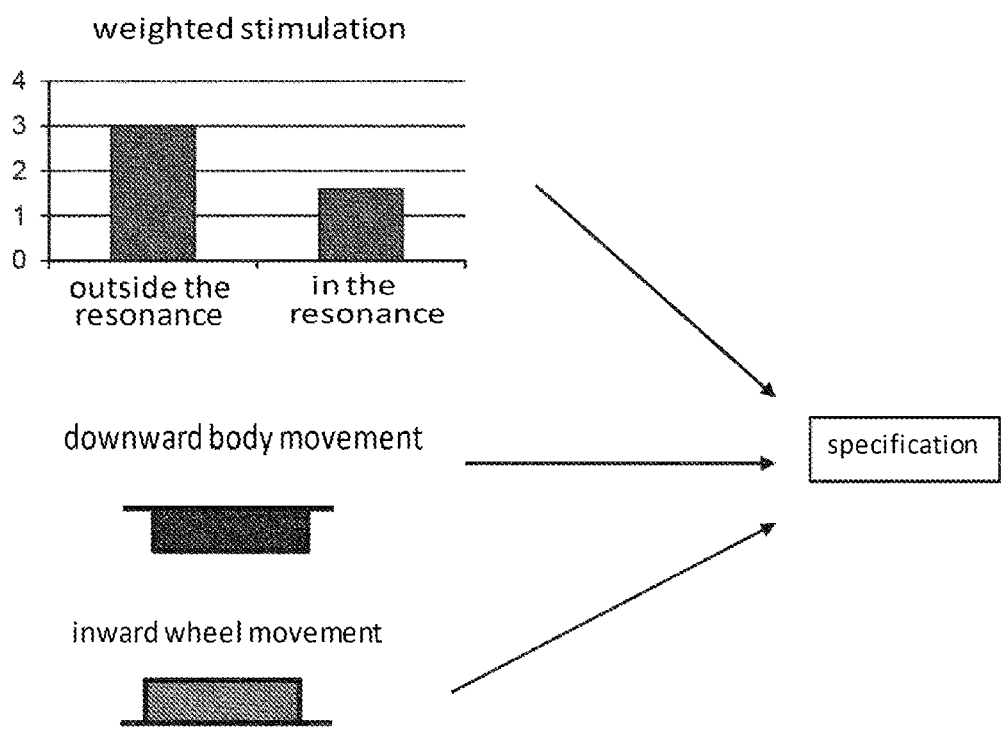
FIG. 6 shows a third disclosed embodiment version for analysis of the amplitude spectrum.

FIG. 6 shows the possibility for additionally weighting the stimulation of the expected downward movement of the transportation vehicle body and the expected deflection of the wheels of the transportation vehicle as further criteria to be taken into account for determining the specification of the damping from the road stimuli.

During the weighting of the damping, body frequency and wheel frequency stimulations may also be negatively weighted. This results in greater attenuation of body frequency and wheel frequency stimulations. In this case, heavier weighting of the body frequency stimulations primarily results in more comfortable behavior, whereas heavier weighting of the wheel frequency components primarily results in safer driving behavior.

The damping should be as little as possible for stronger road stimuli to introduce as few stimuli as possible into the transportation vehicle body. This particularly applies to stimulation frequencies away from the natural frequency of the body. In the range from about 0.8 to 2 Hz (corresponding to the natural frequency of the body, the natural yaw frequency and the natural pitch frequency) and in the region of the natural frequency of the wheel in the range from about 10-15 Hz, too little damping results in an unwanted resonance increase. In order to take this into account, a weighted road stimulus can be determined such that stimulations outside the resonant frequencies are positively weighted. Stimulations at the resonant frequency can then be negatively weighted. With the weighting, an unevenness value can be determined. If the damping is adjusted inversely to the unevenness value, then the transportation vehicle is driving outside the resonant frequencies with a low damping for greater stimulation. As a result, the shocks are only introduced into the body to a minimal extent. If the stimulation lies in the region of the resonant frequencies, the transportation vehicle is driving on the road with a large damping.

As a result, a resonant increase in the amplitudes is substantially minimized. In a particular version thereof, the damping can be adjusted in inverse proportion to the unevenness value.

Another version consists of determining the stimulations at the natural frequency and the stimulations away from the natural frequency separately. For this purpose, a narrowly limited frequency range can be considered about each natural frequency, which can be selected depending on the resonant peak occurring. With the values, the optimum damping can then be determined in a characteristic field. With increasing resonant stimulation, greater damping is adjusted, with increasing stimulation outside the resonance less damping is adjusted. If large resonant stimulations and non-resonant stimulations occur at the same time, then a characteristic field of this type enables the setting of a situation-specific optimum compromise.

The disclosure has been described in detail above using exemplary embodiments and further modifications. Individual technical features, which have been described above in the context of other individual features, can be implemented independently thereof and in combination with other individual features, even if this not explicitly described, as long as this is technically possible. The disclosure is expressly not limited to the described exemplary embodiments but comprises all the embodiments defined by the claims.

REFERENCE CHARACTER LIST 1 transportation vehicle
2 transportation vehicle wheel
3 vibration damper
4 transportation vehicle body
5 control valve
6 control unit
7 acceleration sensor
8 level sensor
9 front axle
10 rear axle
11 steering angle sensor
12 wheel revolution rate sensor
13 camera
14 camera control unit

The invention claimed is:

1. A method for actuating a vibration damper of a wheel of a transportation vehicle, the method comprising:
generating data representing topography of a road portion ahead of the transportation vehicle;
analyzing the data to identify an unevenness profile of the road portion and to determine an amplitude spectrum of the unevenness profile to determine a damping command value, wherein analyzing the data includes identifying a first average amplitude of stimuli of the road portion inside a predefined range of natural frequencies of a body of the transportation vehicle and identifying a second average amplitude of the stimuli outside the predefined range of the natural frequencies of the body of the transportation vehicle, and wherein analyzing the data to determine the damping command value includes performing a comparison between the first average amplitude and the second average amplitude; and
adjusting the vibration damper by actuating the vibration damper according to the damping command value based on the comparison between the first average amplitude and the second average amplitude.

2. The method of claim 1, wherein analyzing the data includes determining, based on the amplitude spectrum of the unevenness profile, a weighted amplitude, and wherein actuating the vibration damper is based on the weighted amplitude.

3. The method of claim 2, wherein the weighted amplitude is determined based on amplitudes of the amplitude spectrum that are greater than a natural frequency of the body of the transportation vehicle.

4. The method of claim 2, wherein analyzing the data includes detecting a vertical movement of the body of the transportation vehicle to determine the damping command value based on the vertical movement of the body and performing a weighing of the damping command value based on the amplitude spectrum relative to the damping command value based on the vertical movement of the body, and wherein adjusting the vibration damper is based on the weighting.

5. The method of claim 4, wherein performing the weighting includes giving a first weight to the damping command value based on the amplitude spectrum and a second weight to the damping command value based on the vertical movement of the body, the first weight being greater than the second weight, in response to the amplitude spectrum of the unevenness profile being greater than a predefined spectrum and the vertical movement being smaller than a threshold movement.

6. The method of claim 2, wherein determining the weighting includes giving a first weight to the first average amplitude and a second weight to a second average amplitude, the first weight being smaller than the second weight, and wherein adjusting the vibration damper includes actuating the vibration damper according to the damping command value adjusted inversely relative to a result of the weighing.

7. The method of claim 1, wherein the damping command value is increased in response to the first average amplitude being greater than the second average amplitude and the damping command value is reduced in response to the first average amplitude being smaller than the second average amplitude.

8. The method of claim 7, wherein analyzing the data includes specifying a characteristic field for the damping command value, and wherein the characteristic field uses as input variables one value from each of the first average amplitude and the second average amplitude.

9. The method of claim 1, wherein analyzing the data includes identifying a third average amplitude of the stimuli inside a predefined range of natural frequencies of the wheel of the transportation vehicle and identifying a fourth average amplitude of the stimuli outside the predefined range of the natural frequencies of the wheel of the transportation vehicle, and wherein analyzing the data to determine the damping command value includes performing a comparison between the third average amplitude and the fourth average amplitude, and wherein the damping command value is increased in response to the third average amplitude being greater than the fourth average amplitude and the damping command value is reduced in response to the third average amplitude being smaller than the fourth average amplitude.

10. A suspension system for a transportation vehicle comprising:
a vibration damper operably coupled to a wheel of the transportation vehicle; and
a controller configured to:
generate data representing topography of a road portion ahead of the transportation vehicle,
analyze the data to identify an unevenness profile of the road portion and to determine an amplitude spectrum of the unevenness profile to determine a damping command value, wherein to analyze the data includes to identify a first average amplitude of stimuli of the road portion inside a predefined range of natural frequencies of a body of the transportation vehicle and to identify a second average amplitude of the stimuli outside the predefined range of the natural frequencies of the body of the transportation vehicle, and wherein to analyze the data to determine the damping command value includes to perform a comparison between the first average amplitude and the second average amplitude, and
adjust the vibration damper by actuating the vibration damper according to the damping command value based on the comparison between the first average amplitude and the second average amplitude.

11. The suspension system of claim 10, wherein the controller is further configured to analyze the data by determining, based on the amplitude spectrum of the unevenness profile, a weighted amplitude and actuating the vibration damper is based on the weighted amplitude.

12. The suspension system of claim 11, wherein the controller is further configured to determine the weighted amplitude based on amplitudes of the amplitude spectrum that are greater than a predefined range of natural frequencies of the body of the transportation vehicle.

13. The suspension system of claim 10, wherein the controller is further configured to increase the damping command value in response to the first average amplitude being greater than the second average amplitude and to reduce the damping command value in response to the first average amplitude being smaller than the second average amplitude.

14. The suspension system of claim 10, wherein the controller is further configured to analyze the data by identifying a third average amplitude inside a predefined range of natural frequencies of the wheel of the transportation vehicle and identifying a fourth average amplitude outside the predefined range of the natural frequencies of the wheel of the transportation vehicle, and wherein analyze the data to determine the damping command value by performing a comparison between the third average amplitude and the fourth average amplitude, and wherein the controller is further configured to increase the damping command value in response to the third average amplitude being greater than the fourth average amplitude and to reduce the damping command value in response to the third average amplitude being smaller than the fourth average amplitude.

15. A transportation vehicle comprising:
a vibration damper operably coupled to a wheel of the transportation vehicle;
a camera configured to capture topography of a road portion ahead of the transportation vehicle; and
a controller configured to:
receive data representing the topography of the road portion captured by the camera,
analyze the data to identify an unevenness profile of the road portion and to determine a amplitude spectrum of the unevenness profile to determine a damping command value, wherein to analyze the data includes to identify a first average amplitude of stimuli of the road portion inside a predefined range of natural frequencies of a body of the transportation vehicle and to identify a second average amplitude of the stimuli outside the predefined range of the natural frequencies of the body of the transportation vehicle, and wherein to analyze the data to determine the damping command value includes to perform a comparison between the first average amplitude and the second average amplitude, and
when the wheel is traveling over the road portion, cause the vibration damper to actuate according to the damping command value based on the comparison between the first average amplitude and the second average amplitude.

16. The transportation vehicle of claim 15, wherein the controller is further configured to increase the damping command value in response to the first average amplitude being greater than the second average amplitude and to reduce the damping command value in response to the first average amplitude being smaller than the second average amplitude.

17. The transportation vehicle of claim 15, wherein the controller is further configured to analyze the data by identifying a third average amplitude inside a predefined range of natural frequencies of the wheel of the transportation vehicle and identifying a fourth average amplitude outside the predefined range of the natural frequencies of the wheel of the transportation vehicle and analyze the data to determine the damping command value by performing a comparison between the third average amplitude and the fourth average amplitude, and wherein the controller is further configured to increase the damping command value in response to the third average amplitude being greater than the fourth average amplitude and to reduce the damping command value in response to the third average amplitude being smaller than the fourth average amplitude.

\* \* \* \* \*